United States Patent
Haycock et al.

(10) Patent No.: US 7,687,180 B2
(45) Date of Patent: Mar. 30, 2010

(54) OVERMOLDED SUPPORT PLATE FOR FUEL CELL

(75) Inventors: Steven Mac Haycock, Northville, MI (US); Joseph John Heystek, Royal Oak, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 1540 days.

(21) Appl. No.: 10/881,466

(22) Filed: Jun. 30, 2004

(65) Prior Publication Data

US 2006/0003208 A1    Jan. 5, 2006

(51) Int. Cl.
H01M 2/08 (2006.01)
H01M 2/00 (2006.01)
H01M 8/00 (2006.01)

(52) U.S. Cl. .............................. 429/35; 429/12; 429/27; 429/34

(58) Field of Classification Search ............. 429/12–47, 429/152, 210, 160; 277/590–596; 428/66.4; 439/587–589
See application file for complete search history.

(56) References Cited

U.S. PATENT DOCUMENTS

| | | | |
|---|---|---|---|
| 3,723,181 A * | 3/1973 | Oakley | 429/152 |
| 4,542,082 A * | 9/1985 | Rowlette | 429/210 |
| 5,145,190 A * | 9/1992 | Boardman | 277/596 |
| 6,007,933 A * | 12/1999 | Jones | 429/38 |
| 6,337,120 B1 * | 1/2002 | Sasaki et al. | 428/66.4 |
| 6,338,492 B1 * | 1/2002 | Schilling et al. | 277/630 |
| 6,350,538 B1 | 2/2002 | Wilkinson et al. | |
| 6,423,439 B1 | 7/2002 | Barton et al. | |
| 6,716,550 B1 | 4/2004 | Kirby et al. | |
| 7,070,876 B2 | 7/2006 | Artibise et al. | |
| 7,122,273 B2 * | 10/2006 | Chaix | 429/122 |
| 2004/0096730 A1 * | 5/2004 | Kuroki et al. | 429/44 |
| 2004/0191604 A1 | 9/2004 | Artibise et al. | |

FOREIGN PATENT DOCUMENTS

JP     05242897 A  *   9/1993

OTHER PUBLICATIONS

Machine Translation and Abstract in English of JP 05-242897.*

* cited by examiner

*Primary Examiner*—Dah-Wei D Yuan
*Assistant Examiner*—Claire L Rademaker
(74) *Attorney, Agent, or Firm*—Ronald W. Wangerow; Harness, Dickey & Pierce, P.L.C.

(57) ABSTRACT

A fuel cell component is provided including a support plate, a membrane electrode assembly, and a resilient member. The support plate defines a bore extending between a first surface and a second surface. The membrane electrode assembly engages the second surface of the support plate. The resilient member defines a leg and a bead. The leg is disposed within the bore and adheres to the membrane electrode assembly. The bead engages the first surface of the support plate to maintain the membrane electrode assembly in engagement with the second surface of the support plate.

27 Claims, 4 Drawing Sheets

OVERMOLDED SUPPORT PLATE FOR FUEL CELL

FIELD OF THE INVENTION

The present invention relates to a fuel cell component and, more particularly, a combined support plate and gasket for a fuel cell and method of manufacturing the same.

BACKGROUND OF THE INVENTION

Typical proton exchange membrane (PEM) fuel cells include a membrane electrode assembly (MEA) sandwiched between a pair of bipolar plates. Additionally, PEM fuel cells can include an anode support plate and a cathode support plate. The anode support plate is disposed between the MEA and one of the bipolar plates. The cathode support plate is disposed between the MEA and the other bipolar plate. The support plates help increase the integrity and rigidity of the MEA. Furthermore, a gasket is disposed between the support plates and their respective bipolar plates.

During assembly, the MEA is adhered to each of the support plates. A standard adhesive such as epoxy is applied to a perimeter region of each side of the MEA. The support plates are then adhered thereto. Next, the gaskets are either adhered to or positioned adjacent the opposite sides of the support plates. Finally, the subassembly is clamped between the bipolar plates.

SUMMARY OF THE INVENTION

A fuel cell component is provided including a support plate, a membrane electrode assembly, and a resilient member. The support plate defines a bore extending between a first surface and a second surface. The membrane electrode assembly engages the second surface of the support plate. The resilient member defines a leg and a bead. The leg is disposed within the bore and adheres to the membrane electrode assembly. The bead engages the first surface of the support plate to maintain the membrane electrode assembly in engagement with the second surface of the support plate.

Another aspect of the present invention provides a fuel cell assembly including a current collector plate, a membrane electrode assembly, a support plate, and a resilient member. The support plate is disposed between the current collector plate and the membrane electrode assembly. The support plate defines a bore extending between a first surface and a second surface. The resilient member defines a leg and a bead. The leg is disposed within the bore and adheres to the membrane electrode assembly. The bead provides a seal between the current collector plate and the support plate.

A further aspect of the present invention provides a fuel cell assembly including a current collector plate, a membrane electrode assembly, a support plate, and a resilient member. The membrane electrode assembly includes a proton transmissive membrane, a gas diffusion layer, and a frame. The proton transmissive membrane defines an active region and a perimeter region. The gas diffusion layer is disposed adjacent to the active region of the proton transmissive membrane. The frame is disposed adjacent to the perimeter region of the proton transmissive membrane. The support plate is disposed between the current collector plate and the membrane electrode assembly. The support plate defines a bore extending between a first surface and a second surface. The resilient member defines a leg and a bead. The leg is disposed within the bore and adheres to the frame of the membrane electrode assembly. The bead is disposed adjacent the first surface of the support plate and sealingly engages the current collector plate.

A yet further aspect of the present invention provides a method of manufacturing a fuel cell component. First, a support plate is selected. The support plate defines a bore extending between a first surface and a second surface. Next, a membrane electrode assembly is positioned adjacent to the second surface of the support plate. Finally, the membrane electrode assembly is attached to the support plate by injecting a resilient material into the bore.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and is in no way intended to limit the invention, its application, or uses.

Figure 1:
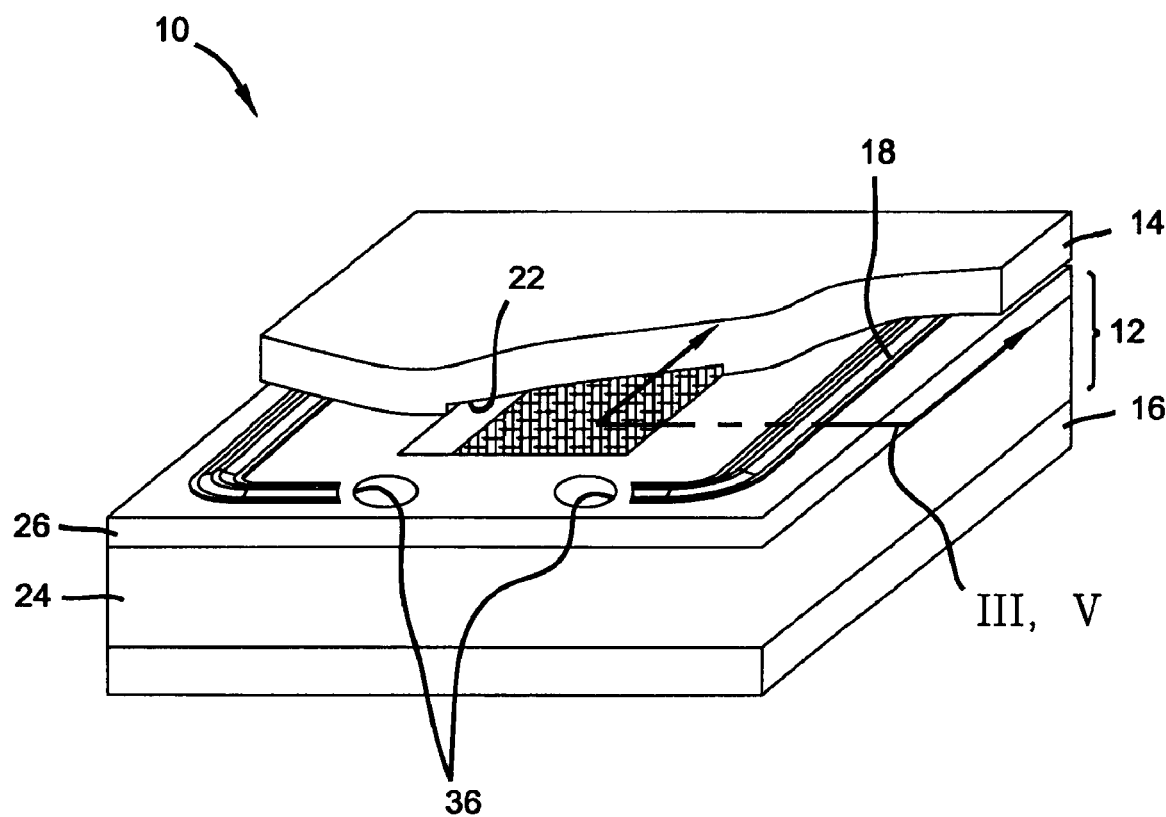
FIG. 1 is a partial cut-away perspective view of a fuel cell in accordance with the principles of the present invention.
Figure 2:
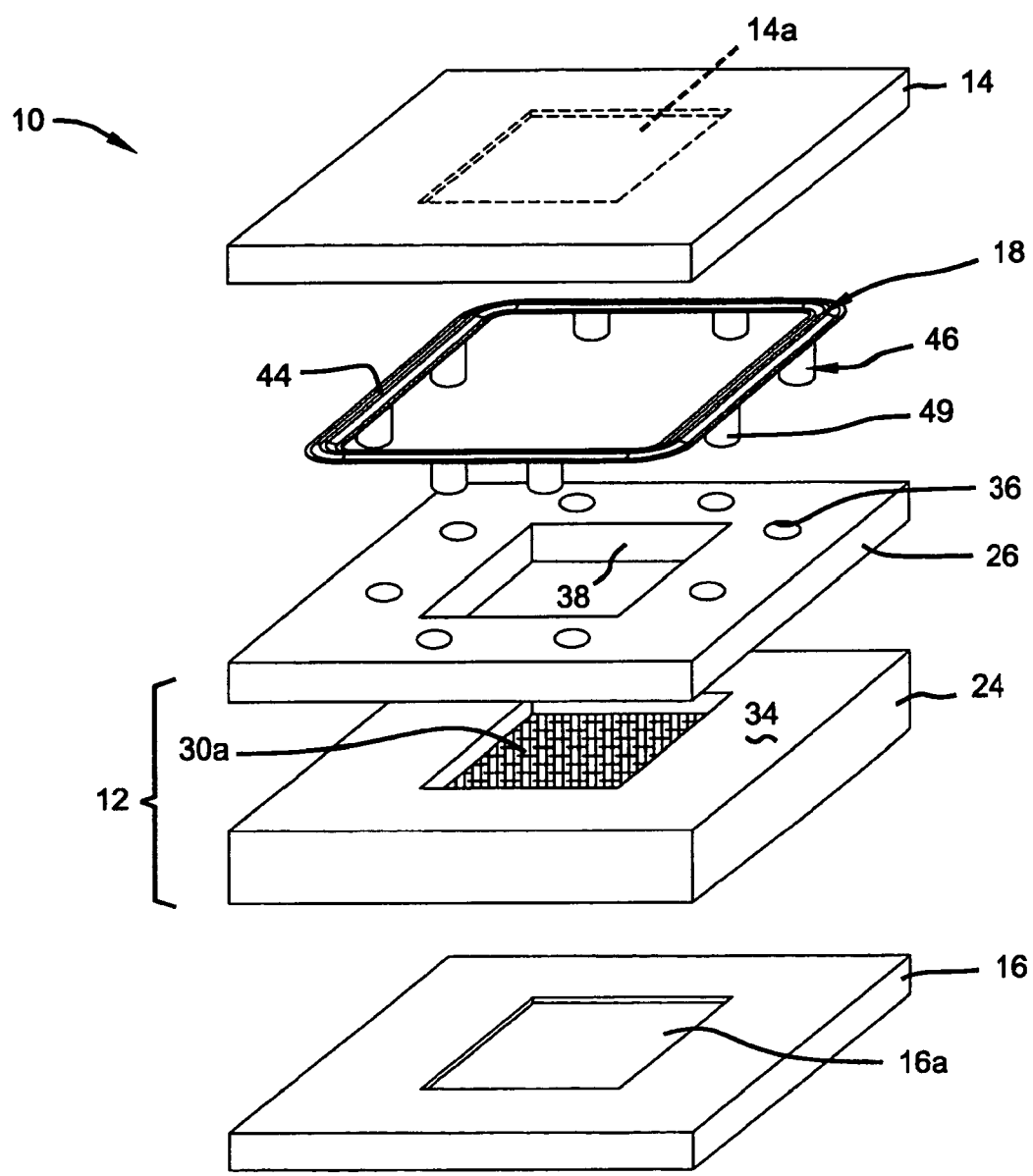
FIG. 2 is an exploded perspective view of the fuel cell of FIG. 1.

FIGS. 1 and 2 depict a fuel cell 10 in accordance with the principles of the present invention. The fuel cell 10 generally includes a fuel cell component 12 sandwiched between an anode current collector plate 14 and a cathode current collector plate 16. A resilient member 18 is disposed between the fuel cell component 12 and the anode current collector plate 14. The anode current collector plate 14 and cathode current collector plate 16 include respective recessed regions 14a, 16a. The recessed regions 14a, 16a cooperate with the fuel cell component 12 to define a pair of opposing pockets. FIG. 1 illustrates a top pocket 22 disposed between the anode current collector plate 14 and the fuel cell component 12. A similar pocket exists between the cathode current collector plate 16 and the fuel cell component 12. The pockets are adapted to receive a reactant gas, which is necessary for operating the fuel cell 10. For example, hydrogen gas would be delivered to the pocket adjacent the anode current collector plate 14 and oxygen gas would be delivered to the pocket adjacent the cathode current collector plate 16. The resilient member 18 provides the necessary sealing engagement between the fuel cell component 12 and the anode current collector plate 14 to retain the reactant gases within the pocket 22.

Figure 3:
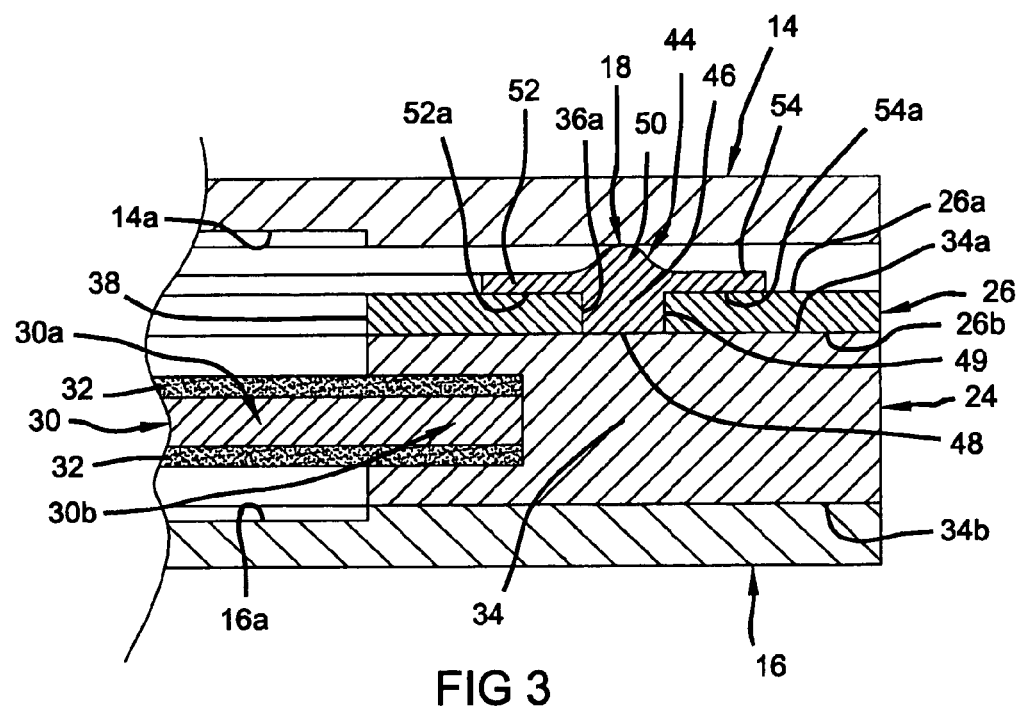
FIG. 3 is a side cross-sectional view taken through line III of FIG. 1.

The fuel cell component 12 includes a membrane electrode assembly (MEA) 24 and an anode support plate 26. As shown in FIG. 3, the MEA 24 includes an ion transmissive membrane 30, a pair of gas diffusion layers 32, and a frame 34. The ion transmissive membrane 30 includes a thin membrane material coated in a catalyst, such as NAFION® (a sulfonated tetrafluoroethylene based fluoropolymer-copolymer), for inducing the necessary fuel cell reaction. The ion transmissive membrane 30 includes an active region 30a and a perimeter region 30b. The pair of gas diffusion layers 32 sandwich the ion transmissive membrane 30. The gas diffusion layers 32 each include an electrically conductive gas transmissive member, such as a carbon fiber. The frame 34 is a generally planar member encapsulating the perimeter portion 30b of the ion transmissive membrane 30. The frame 34 also encapsulates a perimeter portion of the gas diffusion layers 32, thereby securing the ion transmissive membrane 30 between the pair of gas diffusion layers 32. The frame 34 includes a top surface 34a and a bottom surface 34b. In an exemplary embodiment, the frame 34 is constructed of a silicone.

The anode support plate 26 is a generally square plastic member having dimensions substantially similar to the MEA 24. The anode support plate 26 includes a top surface 26a, a bottom surface 26b, a plurality of bores 36, and a window 38. The plurality of bores 36 include bore walls 36a and are substantially axially aligned with the frame 34 of the MEA 24. The window 38 is substantially axially aligned with the active region 30a of the ion transmissive membrane 30. The top surface of the frame 34a of the MEA 24 engages the bottom surface 26b of the anode support plate 26. The bottom surface of the frame 34 of the MEA 24 engages the cathode current collector plate 16.

FIGS. 2 and 3 depict the resilient member 18 in detail. The resilient member 18 is depicted in a relaxed state for discussion only; however, it should be appreciated that the resilient member 18 would be compressed slightly during operation of the fuel cell 10. The resilient member 18 includes a bead 44 and a plurality of legs 46. The plurality of legs 46 are disposed within the plurality of bores 36 in the anode support plate 26. The plurality of legs 46 each include a foot surface 48 and a cylindrical surface 49. The foot surfaces 48 are disposed substantially flush with the bottom surface 26b of the anode support plate 26. The foot surfaces 48 adheringly engage the top surface 34a of the frame 34 of the MEA 24. In one embodiment, the cylindrical surfaces 49 frictionally engage the bore walls 36a of the bores 36. In an alternative embodiment, the cylindrical surfaces 49 adheringly engage to the bore walls 36a of the bores 36. The bead 44 includes a sealing portion 50, an internal flange portion 52, and an external flange portion 54. The sealing portion 50 sealingly engages the anode current collector plate 14. This provides a seal between the anode support plate 26 and the anode current collector plate 14. In the embodiment illustrated, the sealing portion 50 includes a generally arch-shaped cross-section. It should be appreciated, however, that the sealing portion 50 may alternatively include a square, triangular, or any other cross-section capable of providing an effective seal between the MEA 24 and the anode support plate 26. The internal and external flange portions 52, 54 include engaging surfaces 52a, 54a that engage the top surface 26a of the anode support plate 26. This engagement, in cooperation with the adhering engagement between the foot surfaces 48 and the top surface 34a of the frame 34 of the MEA 30, maintain the axial disposition of the anode support plate 26 relative to the MEA 24. In an exemplary embodiment, the resilient member 18 is constructed of a silicone.

Figure 5:
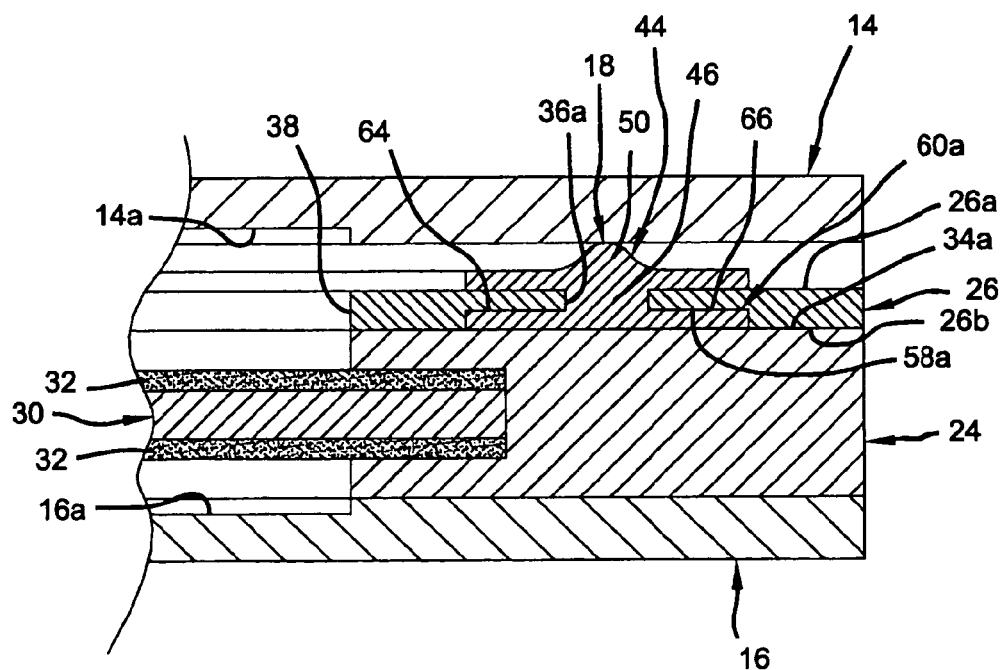
FIG. 5 is a side cross-sectional view of an alternative embodiment of the fuel cell of FIG. 1 taken through line V of FIG. 1.
Figure 4:
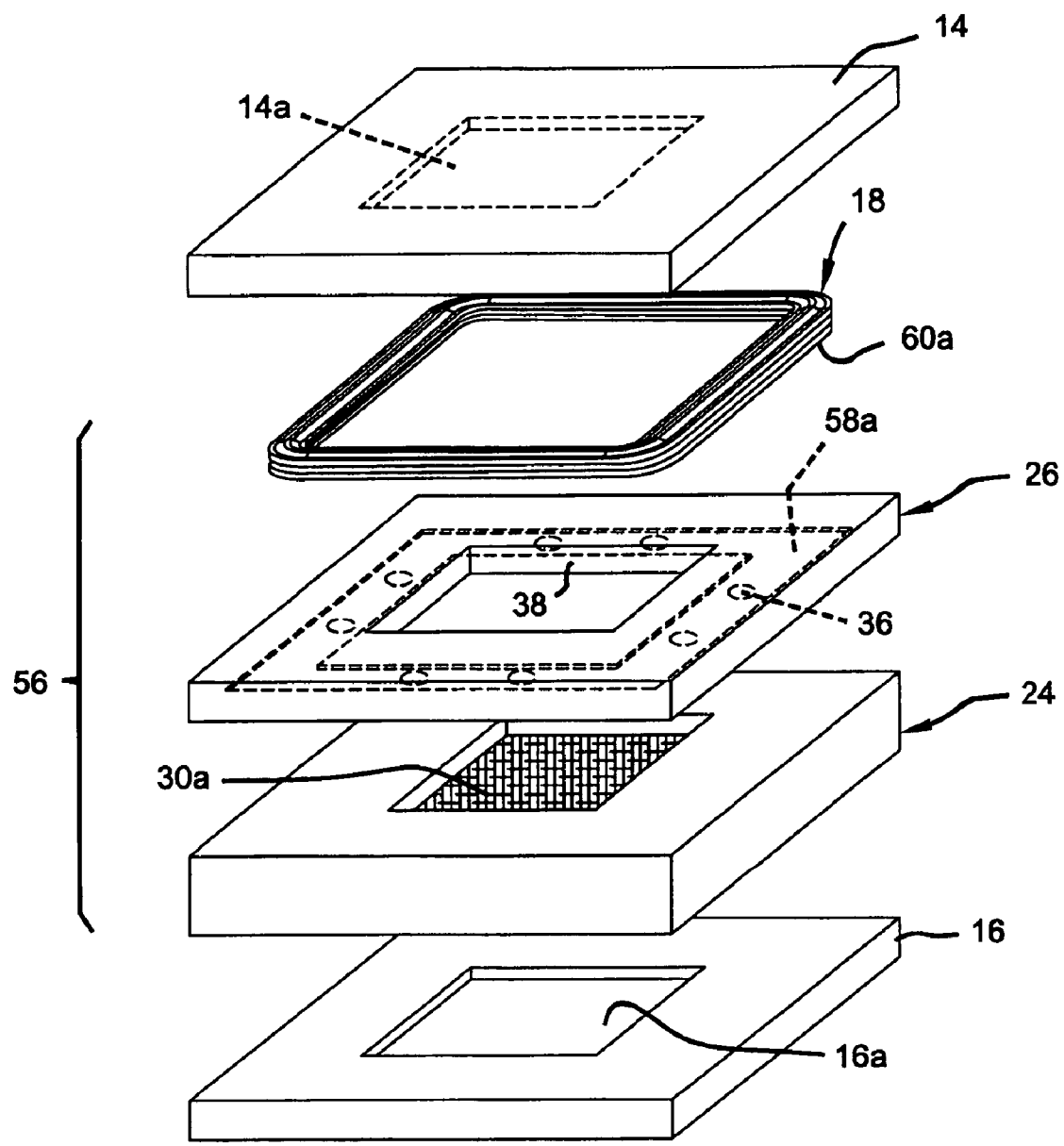
FIG. 4 is an exploded perspective view of an alternative embodiment of the fuel cell of FIG. 1.

FIGS. 4 and 5 depict an alternative embodiment of a fuel cell component 56. The fuel cell component 56 is generally similar to that described above, with the exception that the anode support plate 26 includes a recessed surface 58 and the resilient member 18 includes a foot pad portion 60. The anode support plate 26 includes the recessed surface 58 formed in its bottom surface 26b. The recessed surface 58 is substantially axially aligned with the plurality of bores 36 in the anode support plate 26.

The foot pad portion 60 on the resilient member 18 includes an adhering surface 62, an inner engaging surface 64, and an outer engaging surface 66. The inner and outer engaging surfaces 64, 66 engage the recessed surface 58 in the anode support plate 26. In an alternative embodiment, the inner and outer engaging surfaces 64, 66 adheringly engage the recessed surface 58 in the anode support plate 26. The adhering surface 62 adheringly engages the top surface 34a of the frame 34 of the MEA 24. Therefore, the inner and outer engaging surfaces 64, 66 in combination with the adhering surface 62 and the bead 44 maintain the axial disposition of the anode support plate 26 relative to the MEA 24. It should be appreciated that the foot pad portion 60 provides the benefit of an increased adhesive area between the resilient members 18 and the MEA 24. Furthermore, it should be appreciated that while the resilient member 18 is illustrated in FIGS. 4 and 5 as including a single foot pad portion 60 extending between each of the plurality of legs 46, a resilient member including a separate foot pad portion 60 disposed on each of the plurality of legs 46 is intended to be within the scope of the present invention.

Referring back to FIGS. 2 and 3, the fuel cell component 12 is assembled in the following manner. First, the MEA 24 is selected. The anode support plate 26 is then machined to the appropriate size. This includes cutting the windows 38 and pluralities of bores 36 into the anode support plate 26. Then the MEA 24 is positioned such that the top surface 34a of the frame 34 is adjacent to the bottom surface 26b of the anode support plate 26. A semi-liquid resilient material is then injected into the bores 36 of the anode support plate 26 to form the legs 46. The semi-liquid resilient material adheres to the top surface 34a of the frame 34 of the MEA 24. Finally, additional semi-liquid resilient material is applied to create the bead 44 on the top surface 26a of the anode support plate 26. This process is continued until each of the bores 36 in the anode support plate 26 are filled with the semi-liquid resilient material and the bead 44 completely wraps around the top surface 26a of the anode support plate 26. Therefore, it should be appreciated that the present invention provides the benefits of simultaneously attaching the MEA 24 to the anode support plate 26 while also forming the requisite sealing bead 44. It should be appreciated that the same general process would be conducted to assemble the alternative fuel cell component 56 described above. Additionally, however, machining the anode support plate 26 of the alternative fuel cell component 56 would include machining the recessed surface 58. Furthermore, injecting the semi-liquid resilient material would include injecting the material into the recessed surface 58 to form the foot pad portion 60.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell component, comprising:
   a support plate defining a bore extending between a first surface and a second surface;
   a membrane electrode assembly engaging said second surface of said support plate; and
   a resilient member defining a leg disposed within said bore and adhering to said membrane electrode assembly and a bead disposed between a pair of flange portions engaging said first surface of said support plate to maintain said membrane electrode assembly in engagement with said second surface of said support plate, wherein said perimeter region of said membrane electrode assembly includes a frame;

said bore is in communication with said frame such that said resilient member adheringly engages said frame; and said frame directly contacts and entirely encases peripheral edges of said membrane electrode assembly.

2. The fuel cell component of claim 1 wherein said membrane electrode assembly includes a membrane having an active region surrounded by a perimeter region.

3. The fuel cell component of claim 1 wherein said bead includes a radial dimension that is greater than a radial dimension of said bore.

4. The fuel cell component of claim 3 wherein said resilient member includes a substantially T-shaped cross-section.

5. The fuel cell component of claim 1 wherein said leg includes a foot disposed opposite said bead that has a radial dimension that is greater than a radial dimension of said bore.

6. The fuel cell component of claim 5 wherein said resilient member includes a substantially I-shaped cross-section.

7. The fuel cell component of claim 1 wherein said resilient member is constructed of an elastomeric material.

8. A fuel cell assembly, comprising:
a current collector plate;
a membrane electrode assembly;
a support plate disposed between said current collector plate and said membrane electrode assembly, said support plate defining a bore extending between a first surface and a second surface;
a resilient member defining a leg disposed within said bore and adhering to said membrane electrode assembly and a bead disposed between a pair of flange portions providing a seal between said current collector plate and said support plate,
said membrane electrode assembly includes an active region surrounded by a perimeter region;
said perimeter region of said membrane electrode assembly includes a frame;
said leg adheringly engages said frame of said membrane electrode assembly; and
said frame directly contacts and entirely encases peripheral edges of said membrane electrode assembly.

9. The fuel cell assembly of claim 8 wherein said bead is disposed opposite said leg from said membrane electrode assembly and includes a radial dimension that is greater than a radial dimension of said bore.

10. The fuel cell assembly of claim 8 wherein said bead engages said first surface of said support plate to maintain said membrane electrode assembly in engagement with said second surface of said support plate.

11. The fuel cell assembly of claim 8 wherein said resilient member has a substantially T-shaped cross-section.

12. The fuel cell assembly of claim 8 wherein said resilient member defines a foot adheringly engaging said membrane electrode assembly.

13. The fuel cell assembly of claim 12 wherein said foot includes a radial dimension that is greater than a radial dimension of said bore.

14. The fuel cell assembly of claim 13 wherein said resilient member has a substantially I-shaped cross-section.

15. The fuel cell assembly of claim 8 wherein said resilient member is constructed of an elastomeric material.

16. A fuel cell assembly, comprising:
a current collector plate;
a membrane electrode assembly including:
    a proton transmissive membrane defining an active region and a perimeter region;
    a gas diffusion layer disposed adjacent said active region; and
    a frame disposed adjacent said perimeter region;
a support plate disposed between said current collector plate and said membrane electrode assembly defining a bore extending between a first surface and a second surface; and
a resilient member defining a leg disposed within said bore and adhering to said frame of said membrane electrode assembly and a bead disposed between a pair of flange portions disposed adjacent said first surface of said support plate and sealingly engaging said current collector plate,
wherein said frame directly contacts and entirely encases peripheral edges of said membrane electrode assembly.

17. The fuel cell component of claim 16 wherein said bead includes a radial dimension that is greater than a radial dimension of said bore.

18. The fuel cell component of claim 16 wherein said resilient member includes a substantially T-shaped cross-section.

19. The fuel cell component of claim 16 wherein said leg includes a foot disposed opposite said bead that has a radial dimension that is greater than a radial dimension of said bore.

20. The fuel cell component of claim 19 wherein said resilient member includes a substantially I-shaped cross-section.

21. The fuel cell component of claim 16 wherein said resilient member is constructed of an elastomeric material.

22. The fuel cell component of claim 1, wherein said bead is integral with said flange portions.

23. The fuel cell assembly of claim 8, wherein said bead is integral with said flange portions.

24. The fuel cell assembly of claim 16, wherein said bead is integral with said flange portions.

25. The fuel cell component of claim 1, wherein said bore is located outside from edges of the membrane electrode assembly.

26. The fuel cell assembly of claim 8, wherein said bore is located outside from edges of the membrane electrode assembly.

27. The fuel cell assembly of claim 16, wherein said bore is located outside from edges of the membrane electrode assembly.

* * * * *